(12) United States Patent
Wu et al.

(10) Patent No.: US 12,555,110 B2
(45) Date of Patent: Feb. 17, 2026

(54) METHOD AND SYSTEM FOR ERROR-RESILIENT ASSET TRANSFER IN BLOCKCHAIN

(71) Applicant: JINAN UNIVERSITY, Guangzhou (CN)

(72) Inventors: Yongdong Wu, Guangzhou (CN); Jiao Lu, Guangzhou (CN); Shishi Huang, Guangzhou (CN); Tong Li, Guangzhou (CN); Jian Weng, Guangzhou (CN); Zhiquan Liu, Guangzhou (CN); Ming Li, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 89 days.

(21) Appl. No.: 18/537,841

(22) Filed: Dec. 13, 2023

(65) Prior Publication Data
US 2025/0061458 A1    Feb. 20, 2025

(30) Foreign Application Priority Data
Aug. 16, 2023    (CN) .......................... 202311029127.1

(51) Int. Cl.
*G06Q 20/00*    (2012.01)
*G06Q 20/36*    (2012.01)
*G06Q 20/40*    (2012.01)

(52) U.S. Cl.
CPC ..... *G06Q 20/4014* (2013.01); *G06Q 20/3678* (2013.01)

(58) Field of Classification Search
CPC .......... G06Q 20/4014; G06Q 20/3678; G06Q 20/223; G06Q 20/3825; G06Q 20/3829; G06Q 20/401; H04L 9/3239; H04L 9/3247; H04L 9/50; H04L 67/1059

USPC .................... 705/16, 21; 380/44, 262, 278
See application file for complete search history.

(56) References Cited

U.S. PATENT DOCUMENTS

2023/0169510 A1*    6/2023    Koh ................. G06Q 20/40145
                                                                                    705/71

FOREIGN PATENT DOCUMENTS

CN        110383756 B    *    6/2023    ............... H04L 9/14

OTHER PUBLICATIONS

PDF of Foreign Ref is attached (Year: 2017).*
Foreign Ref included (Year: 2017).*

* cited by examiner

*Primary Examiner* — Dante Ravetti
(74) *Attorney, Agent, or Firm* — Bayramoglu Law Offices LLC

(57) ABSTRACT

A fault-tolerant asset transferring method is provided to prevent financial losses caused by human errors, specifically unintentional mistakes made by the payer. The system introduces a new definition for blockchain transaction parameters, allowing for multi-input transactions. Each payment transaction includes the payee's signature for confirmation and the payer's signature. In addition, a system is designed to handle multi-input asset transfer transactions which incorporate the payer's confirmation. Upon reaching an agreement on the transaction content, each participant generates an independent off-chain signature on the transaction's content. In the event that participants generate a signature on the erroneous content of a transaction, the transaction will be accepted in the blockchain with very low probability due to transaction validation.

8 Claims, 4 Drawing Sheets

METHOD AND SYSTEM FOR ERROR-RESILIENT ASSET TRANSFER IN BLOCKCHAIN

CROSS REFERENCE TO THE RELATED APPLICATIONS

This application is based upon and claims priority to Chinese Patent Application No. 202311029127.1, filed on Aug. 16, 2023, the entire contents of which are incorporated herein by reference.

TECHNICAL FIELD

The present invention pertains to the field of blockchain technology and specifically focuses on a remarkably resilient method that supports receiver confirmation on asset transfer.

BACKGROUND

In recent years, blockchain technology has garnered increasing attention in the fields of supply chain, high-performance computing, and search engines, with Bitcoin, Ether, and Hyperledger Fabric serving as notable representatives. Blockchain, a distributed ledger technology, ensures the high security and reliability of historical data in distributed systems. It enables interactions between multiple untrusted participants without the need for a centralized authority.

The academic and industrial communities have shown significant interest in blockchain technology due to its ability to provide untrusted parties with a distributed ledger that guarantees data transparency, integrity, and immutability. This versatility allows blockchain technology to be applied to anonymous online payments, cost-effective remittances, and a wide range of decentralized applications.

The volume and total market capitalization of blockchain technology have experienced explosive growth in recent years, primarily driven by its vital role in the financial sector, where it aids in fraud prevention and misinformation detection. According to PwC's market study, the global blockchain market is projected to reach a value of US$1,431.54 billion by 2030, with a compound annual growth rate (CAGR) of approximately 85.9% between 2022 and 2030.

It is worth noting that an increasing number of crypto assets are gaining tangible value in the real world, which has resulted in an augmented demand for secure, scalable, and efficient blockchain interoperability. Thus, Bitcoin Improvement Proposal (BIP) 70 was proposed to handle the payment issues.

In addition, in all financial fields, it is not uncommon for "fat-finger"-type errors to occur when purchasing, selling, or transferring cryptocurrencies. Such errors refer to the situation where traders unintentionally input incorrect transaction details due to the size of their fingers or inaccurate key sensitivity. This can lead to trading errors, such as inputting the wrong transaction quantity or price, which may result in price fluctuations. Particularly in high-frequency trading, these errors can cause market instability. Incorrect trades can also expose traders and companies to potential trading risks, such as financial losses or legal liabilities. Furthermore, "fat-finger"-type errors can lead to market malfunction, such as incomplete trades or erroneous trading data, affecting the market's efficiency and fairness. This can potentially damage the reputation of traders and financial institutions, especially if such errors occur frequently or result in significant losses. For instance, the significant, rapid, and unexpected drop of US stock indexes in 2010 was caused by an incorrect order in the billions rather than the millions. In 2021, a crypto asset trading platform called DeversiFi erroneously paid out a $24 million fee, and in 2023, an OpenSea collector mistakenly input a 100 ETH bid for a Non-Fungible Token (NFT). Due to the instantaneous and anonymous nature of blockchain transactions, recouping the erroneous funds often relies on the recipient's goodwill. While some blockchains like Ethereum provide a receipt to confirm transaction completion, it cannot prevent the occurrence of "fat finger" by the payer. Therefore, including the recipient's independent confirmation in transactions would be valuable for reducing human errors.

In order to reduce the "fat finger" errors on the touch screen, Microsoft Research produced a prototype device called nano Touch with a rear-mounted touch interface according to the report by Colin Barras. Kong et al. regard a touch as a time series of ovals and offer 15 target-agnostic touch metrics to measure human performance for touch-based systems so as to help touch accuracy investigation. Holz et al. Propose to increase the touch accuracy based on the perceived input point model. In addition, U.S. Pat. No. 11,619,983B2 detects a touch screen touch event a vibro-acoustic event so as to resolve near touch ambiguities. Although the prior art can reduce "fat finger" errors on touch screen, they cannot handle the after-fact errors.

In order to reduce the loss caused by "fat finger", financial institutions usually take measures such as enhanced trader training, the use of trading system limitations and security measures, and the implementation of transaction review and monitoring.

The probability of a single user making a "fat finger" error is small, so a simple and effective solution would be to have transactions confirmed not only by the sender, but also by the receiver, so that the probability of the same error occurring by both users at the same time is greatly reduced. Therefore, a highly fault-tolerant asset transfer method and system that supports receiver confirmation is needed to solve the aforementioned problem.

PATENTS

[1] U.S. Pat. No. 11,619,983B2, Chris Harrison, Julia Schwarz, and Robert Bo Xiao. Method and apparatus for resolving touch screen ambiguities, Apr. 4, 2023.

OTHER PUBLICATIONS

[2] Colin Barras. Fat fingers no problem with 'see-through' touchscreen, 18 Dec. 2008.
[3] Junban Kong, Mingyuan Zhong, James Fogarty, and Jacob O. Wobbrock. Quantifying Touch: New Metrics for Characterizing What Happens During a Touch. Proceedings of the 24th International ACM SIGACCESS Conference on Computers and Accessibility, Article No.: 33, Pages 1-13, October 2022.
[4] Christian Holz and Patrick Baudisch. The Generalized Perceived Input Point Model and How to Double Touch Accuracy by Extracting Fingerprints. Proceedings of the SIGCHI Conference on Human Factors in Computing Systems, Pages 581-590, April 2010.
[5] Paolo Modesti, Siamak F. Shahandashti, Patrick McCorry, and Feng Hao. Formal Modelling and Security Analysis of Bitcoin's Payment Protocol, Computers & Security, Vol. 107, 102279, August 2021.

SUMMARY

Asset transfer protocols are essential for the secure exchange of digital assets distributed over blockchains. Currently, there are some asset exchange problems that need to be solved. Particularly, as the blockchain payment mechanism does not require confirmation from the receiver to accept the payment, it cannot avoid human errors caused by honest "fat finger", which may lead to irreversible loss of assets. Therefore, it is necessary to design a highly fault-tolerant asset transfer method so as to achieve a safe and efficient asset transfer.

The main purpose of the present invention is to overcome the drawbacks and deficiencies of the prior art, and to propose a highly fault-tolerant asset transfer method. To this end, the present method includes receiver's confirmation in the asset transfer transaction, which effectively avoids the generation of erroneous transactions in the event that the transaction content is erroneous due to human error by an honest participant, and further realizes safe and efficient asset transfer in blockchain systems.

Bitcoin transactions have a 32-bit HashType field, which changes the way the signature hash is generated and uses only 8 LSBs (Least Significant Bits) in the HashType and the MSBs (Most Significant Bits) are 0. In such a system, the transaction parameter such as HashType can be redefined and the recipient is asked to confirm the transaction if the value of the 31st bit of its HashType is 1, then the transaction has the additional feature of recipient confirmation, otherwise it is a regular transaction. In addition, Bitcoin transactions can have multiple inputs and multiple outputs.

According to a first aspect of the present invention, there is disclosed a method of highly fault-tolerant asset transfer transactions on a blockchain supporting confirmation by a receiver, wherein the method comprises:
1. Determination of the transaction content, whereby the parties to the transaction negotiate and agree on the transaction content and determine the terms and rules of the transaction;
2. generation of key pairs, signing the transaction content according to the key pairs generated on the blockchain by the two parties to the transaction;
3. the transaction parties exchange signatures and verify each other's signatures. If the verification fails, the transaction is terminated;
4. Any party constructs the transaction and broadcasts it to the blockchain network;
5. the blockchain node checks the transaction and verifies the transaction and packages the block. If the transaction is confirmed and validated successfully, it is packed into a block and the transaction is confirmed and recorded on the blockchain;

According to a second aspect of the present invention, there is disclosed a highly fault-tolerant asset transfer system for transactions on a blockchain to support confirmation by a receiver, wherein the system comprises:
1. means for determining the transaction content, which is used for the parties to the transaction to negotiate and agree on the transaction content and to determine the conditions and rules of the transaction;
2. means for the generation of key pairs for signing the transaction content based on the key pairs generated on the blockchain by the two parties to the transaction;
3. means for the exchange of signatures between the parties to the transaction, capable of verifying the signature of the other party. If the verification fails, the means is able to terminate the transaction;
4. means for the parties to construct the transaction and broadcast it to the blockchain network;
5. means for a blockchain node to check and validate the transaction and pack the block. If the transaction is validated successfully, it is packed into the block and the transaction is confirmed and recorded on the blockchain.

BRIEF DESCRIPTION OF THE DRAWINGS

Embodiments of the invention are described hereinafter in detail with reference to the drawings, in which.

DETAILED DESCRIPTION OF THE EMBODIMENTS

The following discloses the need for embodiments of the present invention for building components of an asset transfer protocol: a highly fault-tolerant asset-transfer system supporting receiver confirmation.

The current blockchain payment mechanism does not require the payee to confirm acceptance of the payment, and therefore cannot tolerate errors caused by "fat finger" of careless players. Assuming that each person independently and identically has a "fat-finger" error rate p<1.0, the joint probability of error caused by the payer and payee will be $p^2$. Therefore, if the transaction must include a payee's confirmation, the number of errors in the transfer of assets will be greatly reduced.

The embodiments described below are intended to improve fault tolerance in the transfer mechanism with respect to erroneous inputs by the payer, avoiding loss of funds due to human error due to the payer.

The present invention presents an asset transfer protocol that can be used to tolerate accidental errors by honest but careless players, and is applicable to any blockchain.

Bitcoin transactions have a 32-bit HashType field that uses only 8 LSBs (Least Significant Bits) and the MSB (Most Significant Bit) are 0. Additionally, Bitcoin transactions can have multiple inputs and multiple outputs. The present invention may redefine HashType as an indicator to add recipient confirmation. If the value of the unused indicator (e.g., the $31^{st}$ bit of its HashType) is 1, the transaction has the additional feature of recipient confirmation, otherwise it is a regular transaction.

Embodiments will be described in detail below with reference to FIGS. 1 to 5.

Figure 1:
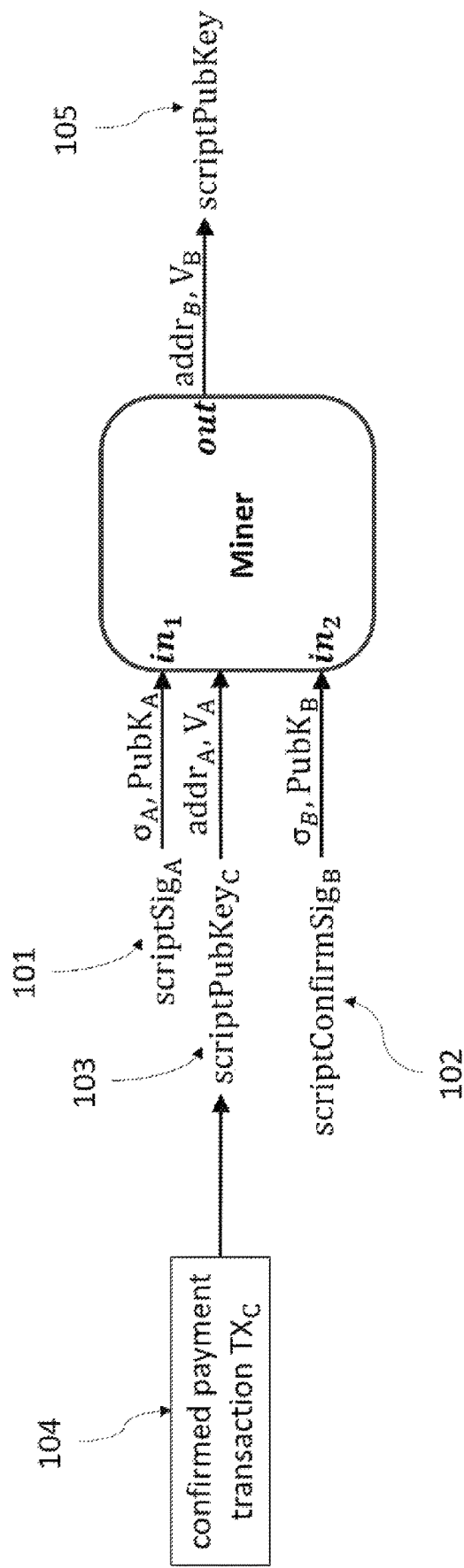
FIG. 1 is a block diagram of the structure of a two-input-one-output transaction of an embodiment of the present invention.

According to an embodiment of the present invention, FIG. 1 illustrates a two-input-one-output data structure for payee confirmation in transaction $TX_n$, where the first input is scriptSig$_A$ 101 from the payer for the payment transaction and the other is scriptConfirmSig$_B$ 102 from the payee for the confirmation. Both inputs have the same syntax, where the second input has a parent identity TXID=0, and the first input has the actual parent identity $TXID_C$, which is the confirmed payment transaction $TX_C$ 104, and its output is $scriptPubKey_C$ 103, where each input can come from one group, and each output can come from the other, $scriptPubKey_C$ is copied from the lock script of the previous transaction, which can be used by the owner of the public key $PubK_A$, and the address $addr_B$ is derived from the public key $PubK_B$. The MSB of the HashType is 1. The output out of the transaction is the transaction scriptPubKey 105.

Figure 2:
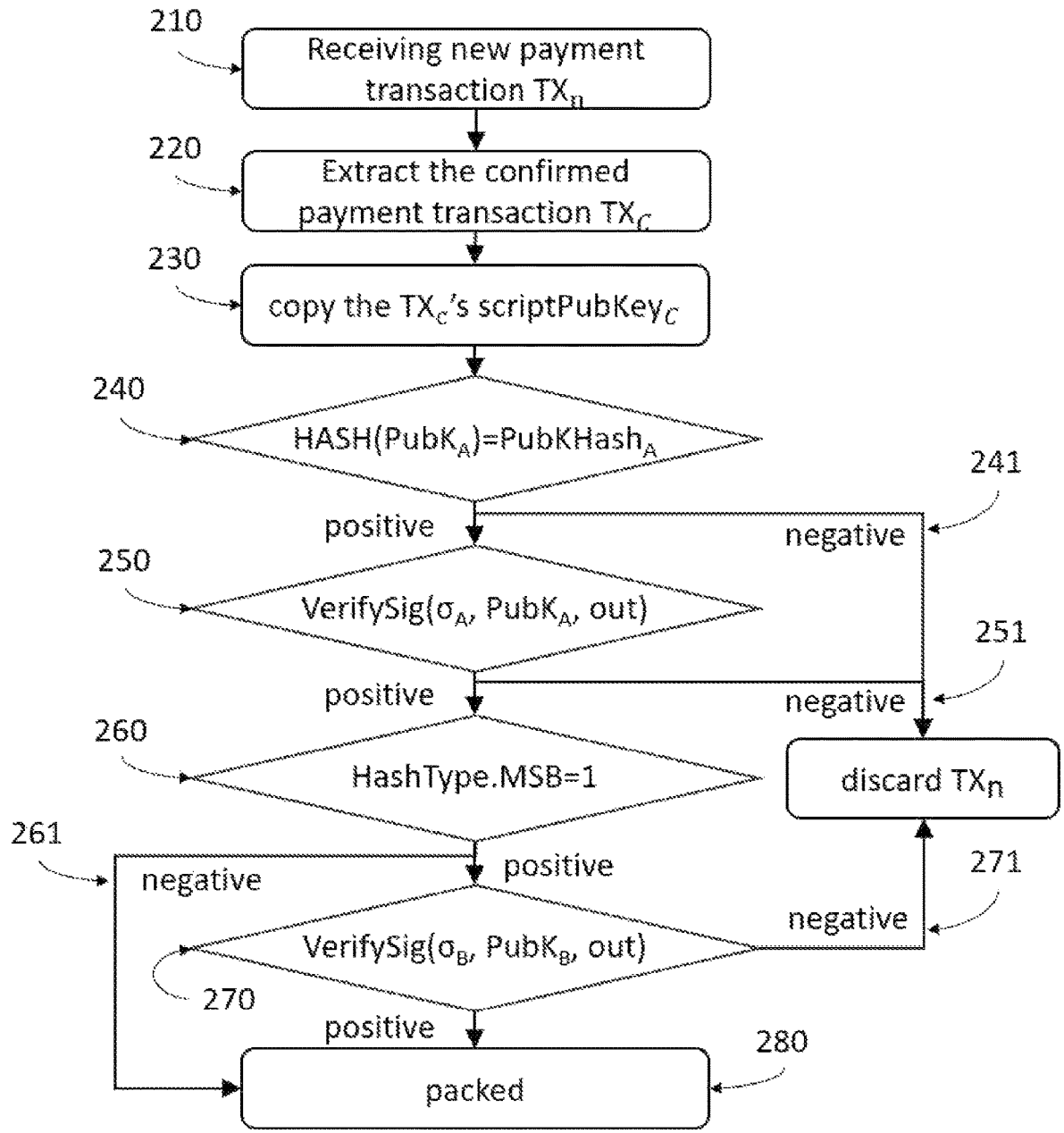
FIG. 2 is a flowchart of the confirmation step of the two-input-one-output transaction of an embodiment of the present invention.

Upon receiving a new payment transaction, the blockchain node will check the signature of the payer as usual. The flow of the two-input-one-output transaction confirmation step according to the embodiment of the present invention is shown in FIG. 2, in steps 210~230, the validation node, i.e., the miner, which obtains the bookkeeping right, will extract the confirmed payment transaction $TX_C$ according to the previous transaction identity $TXID_C$ and copy the $scriptPubKey_C$ of this $TX_C$:
HASH<$PubKHash_A$>VerifySig where HASH(PubK) is a one-way function that converts the public key PubK to a blockchain address, and VerifySig($\sigma$, PubK, m) is a check to see if $\sigma$ is the signature of the message m with respect to the public key PubK. in step 240, the miner checks for the equality between HASH($PubK_A$) and $PubKHash_A$, as well as in step 250, by means of VerifySig($\sigma_A$, $PubK_A$, out) to verify the first input, i.e., the sender's signature. If any verification is negative, the transaction TXn is discarded at the corresponding steps 241 and 251. Otherwise, in step 260, the miner checks whether an indicator such as the MSB of the HashType is 1. If it is not 1, the transaction is a regular transaction, and the transaction is packaged into the block via step 280. If it is 1, the verification of the receiver's signature continues through VerifySig($\sigma_B$, $PubK_B$, out) in step 270. If the verification is negative, the transaction $TX_n$ is discarded at step 271, otherwise, the transaction is packed to the block at step 280.

Figure 3:
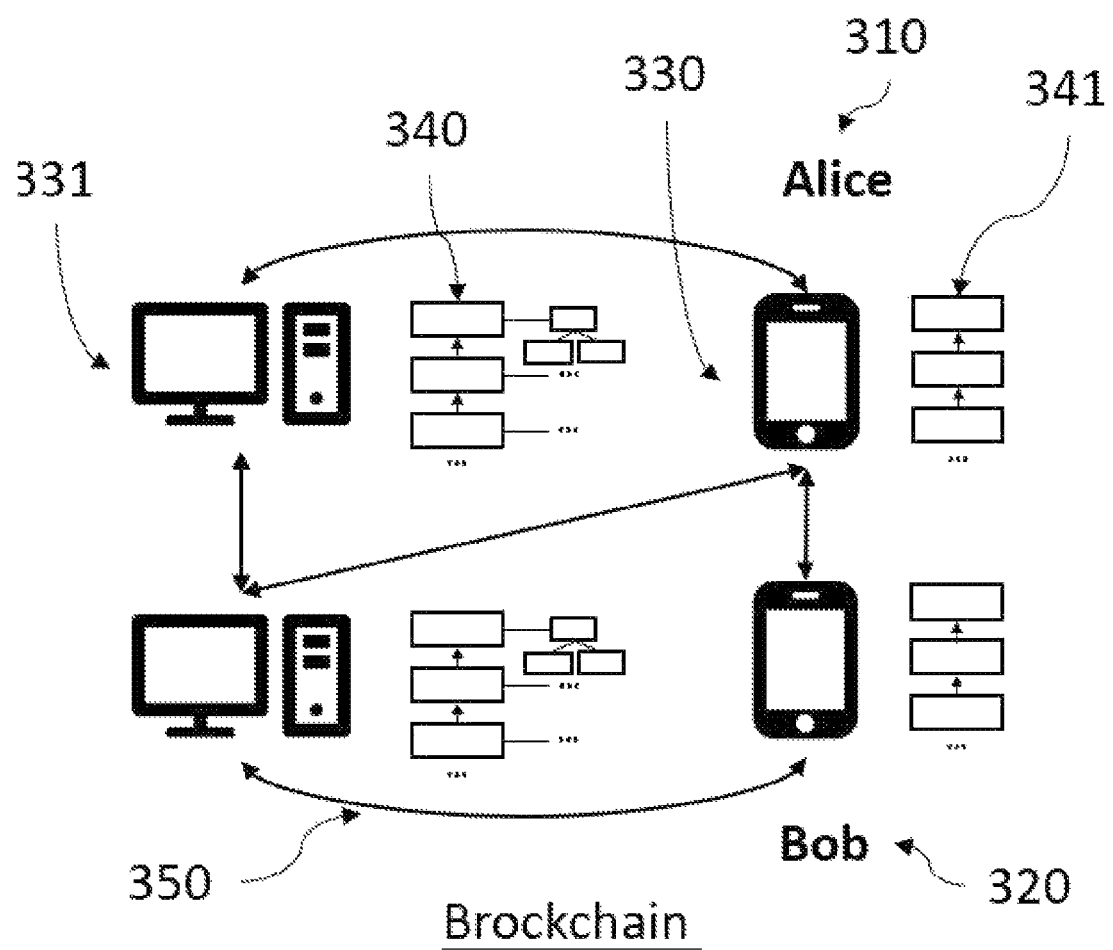
FIG. 3 is a block diagram of a blockchain system of an embodiment of the present invention.

Each payment transaction contains the signature of the payee for confirmation, and the asset transfer protocol is intended to enable participants from different blockchains to exchange digital assets. A block diagram of a blockchain system according to an embodiment of the present invention is shown in FIG. 3, which comprises two participants Alice 310 and Bob 320. Each participant has at least one wallet node on each blockchain with limited resources, also referred to as a light node 330, each node can read the blockchain, but only powerful nodes (e.g., miners) are able to generate and append new blocks to the blockchain, also referred to as a full node 331, in general, a full node stores all the blocks and transaction data for the entire blockchain 340, whereas a light node only needs to store the block header used to verify the legitimacy of the transaction 341. The light nodes and full nodes form a blockchain network 350 based on a peer-to-peer protocol.

Figure 4:
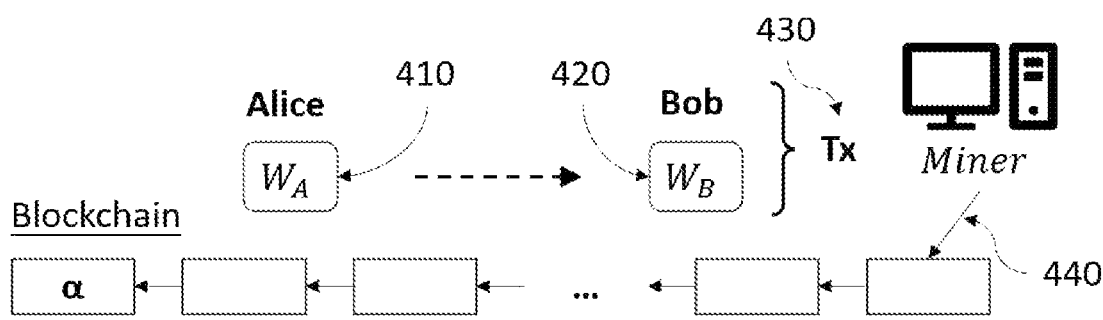
FIG. 4 is a block diagram of the participation of asset transfer of embodiments of the present invention.

The participants in an asset transfer according to an embodiment of the present invention are shown in FIG. 4, without loss of generality, assuming that the participant Alice is the initiator of the transfer process. She has $\alpha$-coin 410 in her wallet $W_A$ and wants to transfer it to Bob's wallet $W_B$ 411 on the Blockchain. The asset transfer will be executed through transaction Tx 430, where Tx represents the transfer of $\alpha$-coin from Alice's wallet $W_A$ to Bob's wallet $W_B$ in the blockchain After transaction Tx is broadcast to the blockchain, a new block will be created independently by each miner in the blockchain, 440. Moreover, according to the blockchain consensus policy, the new block will eventually become effective after a certain confirmation period or delay.

Figure 5:
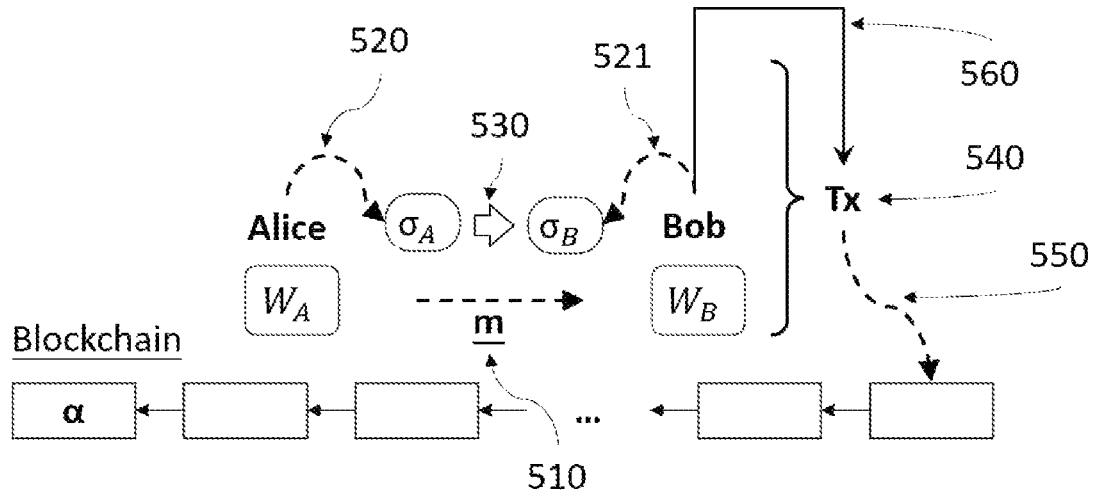
FIG. 5 is a flowchart of the asset transfer step of the embodiment of the present invention.

Take as an example the asset transfer between user Alice and user Bob on the blockchain. Both parties to the transaction comply with the transfer protocol, but may make errors on the inputs. A transfer step according to an embodiment of the present invention is shown in FIG. 5. Concretely:

S1: determine the transaction content, the two players negotiate an agreement on the transaction content and determine the conditions and rules of the transaction, specifically:

Alice and Bob negotiate and agree on the transfer data such as asset type and quantity, transaction price, transaction conditions and transaction fees, etc., determine the conditions and rules of the exchange, and generate transaction content m, 510;

Wherein, in step 510, m contains the asset type, quantity, transaction parameter HashType, and exchange rule of the asset that Alice is prepared to transfer to Bob; in step 511; furthermore, m contains some public information, such as the signer's public key. The transaction content m is represented as follows:

$$m=\{HashType, scriptPubKey, \alpha, auxiliary\ data\}$$

Where $\alpha$ is the amount transferred from Alice to Bob on the blockchain; the MSB (Most Significant Bits) of HashType marks indicates whether the receiver confirms that the transaction amount or not. If it is set to "1", the receiver's signature on confirmation must be included in the transaction.

S2: key pair generation, signing the transaction content according to the key pairs generated on the blockchain by the two parties to the transaction; specifically:

In step 520, Alice owning the key pair ($sk_A$, $pk_A$) on the blockchain, signs m to obtain signatures $\sigma_A$;

In step 521, Bob owning the key pair ($sk_B$, $pk_B$) on the blockchain too, signs m to obtain signature $\sigma_B$.

S3: The two parties exchange signatures and verify each other's signatures. If any verification fails, the transaction is terminated, specifically:

In step 530, Alice sends signature $\sigma_A$ to Bob for verifying the transaction contents and consistency. If fails, the transaction is terminated. So does Bob.

S4: Either party constructs the transaction and broadcasts it to the blockchain network, specifically:

In step 540 Bob constructs transaction Tx=<$\sigma_A$, $\sigma_B$, m> and broadcasts the transaction Tx to the blockchain for the fund transferring;

S5: The blockchain validation nodes or miners check the transaction. If the verification is successful, the transaction is packed into the block and recorded on the blockchain, specifically:

In step 550, for transaction Tx, the blockchain node verifies the signature $\sigma_A$ of the sender, if the verification fails, transaction Tx is discarded; otherwise, it checks whether the indicator such as the MSB of the HashType field in transaction m is "1". If positive, further verifies the signature $\sigma_B$ of the receiver. If the signature $\sigma_B$ of the receiver is successfully verified, the blockchain node packs the transaction Tx into a block such that the transaction Tx will be recorded in the blockchain;

Note that for a multiple-input transaction Tx, if and only if its parent transaction is NULL, the signature is produced by the receiver. The steps depicted in FIG. 5 are the detailed verification steps in steps 550. Note that, although this invention is described with two players, it is also valid for asset transfer for more than two players.

What is claimed is:

1. A fault-tolerant asset transfer method, comprising:
parties agreeing on a transaction content, wherein the transaction content includes a hash type field having an indicator bit set to a predetermined value to signal that a transaction requires payee confirmation;
generating signatures on the transaction content by the parties;
exchanging the signatures
verifying the signatures;
constructing a transaction by either party, wherein the constructed transaction is a multi-input transaction comprising a first input from a payer corresponding to a parent payment transaction and a second unput from the payee for confirmation, the second input corresponding to a null transaction identity;
broadcasting the constructed transaction to a blockchain network;
validating the transaction by blockchain nodes or miners, wherein the validating comprises:
checking the indicator bit of the hash type field; and
responsive to an indicator bit being set to the predetermined value, preforming a mandatory second verification of the payee's signature after successfully verifying the payer's signature, wherein the transaction is packed into a block only if both verifications are successful.

2. The fault-tolerant asset transfer method according to claim 1, wherein the transaction content comprises asset type and quantity, a transaction price, transaction conditions, and a transaction fee, wherein the transaction content is denoted as m.

3. The fault-tolerant asset transfer method according to claim 1, wherein the operation of generating the signatures comprises:
with a key pair $(sk_A, pk_A)$ on the blockchain, a payer Alice signing m to obtain a signature $\sigma_A$ corresponding to the transaction content m;
with a key pair $(sk_B, pk_B)$ on the blockchain, a payee Bob signing m to obtain a signature $\sigma_B$.

4. The fault-tolerant asset transfer method according to claim 1, wherein the operation of exchanging the signatures comprises:
Alice sends a signature $\sigma_A$ to Bob;
Bob sends a signature $\sigma_B$ to Alice.

5. The fault-tolerant asset transfer method according to claim 1, wherein the operation of verifying the signatures comprises that each player verifies the signature on the transaction content m; if a result of the signature verification is negative, a transfer process terminates.

6. The fault-tolerant asset transfer method according to claim 1, wherein the transaction is constructed as $Tx=<\sigma_A, \sigma_B, m>$.

7. The fault-tolerant asset transfer method according to claim 1, wherein the operation of validating the transaction comprises:
after receiving a transaction Tx, the blockchain node or miner verifies a signature $\sigma_A$ of a payer;
checking an indicator comprising a most significant bit (MSB) of a HashType field in the transaction content m; if positive, verifying a signature $\sigma_B$ of a payee.

8. The fault-tolerant asset transfer method according to claim 7, wherein the transaction is rejected if any signature verification fails; otherwise, the blockchain node packs the transaction Tx into a block, and Tx is broadcast to the blockchain.

* * * * *